United States Patent [19]

Jonnes

[11] 4,185,809

[45] Jan. 29, 1980

[54] METHOD AND APPARATUS FOR PULLING LIGHTWEIGHT CABLE

[76] Inventor: Nelson Jonnes, 2620 Edgewood Ct., Stillwater, Minn. 55082

[21] Appl. No.: 873,013

[22] Filed: Jan. 27, 1978

[51] Int. Cl.² ............................................. B66F 3/24
[52] U.S. Cl. ................................................ 254/134.4
[58] Field of Search .................. 254/134.4, 134.3 FT, 254/134.3 R; 15/109.06 R

[56] References Cited

U.S. PATENT DOCUMENTS

| | | | |
|---|---|---|---|
| 2,980,399 | 4/1961 | Littlefield | 254/134.4 |
| 3,346,045 | 10/1967 | Knapp et al. | 166/5 |
| 3,422,631 | 1/1969 | Silverman | 61/72.1 |
| 3,467,196 | 9/1969 | Kinsman | 166/315 |
| 3,589,135 | 6/1971 | Ede | 61/72.1 |
| 3,640,299 | 2/1972 | Nelson | 254/134.4 |
| 4,030,702 | 6/1977 | Ware et al. | 254/134.4 |

*Primary Examiner*—Robert C. Watson

[57] ABSTRACT

A method of installing lightweight cable in a conduit by placing a leakproof tubing in a conduit, joining the sections of tubing together to make a continuous length of tubing and attaching to one end of the tubing a fitting having a liquid tight passage for sliding cable therethrough and an inlet passage for pumping fluid into the tubing. Fluid under pressure provides a lubricant while forcing a pulling plug through the tubing. A lightweight cable attached to the pulling plug pulls the lightweight cable through the lubricating fluid in the tubing without breaking the cable. If the fluid used is liquid it is removed from the tubing by using pressurized gas to force a wiper plug along the cable and inside of the tubing.

The apparatus of the invention includes a deformable pulling plug that slides along the inside of tubing, pulling the lightweight cable therewith. A deformable wiper plug is provided having an opening for sliding along the cable and inside the tubing to forceably remove liquids in the tubing.

8 Claims, 3 Drawing Figures

4,185,809

METHOD AND APPARATUS FOR PULLING LIGHTWEIGHT CABLE

BACKGROUND OF THE INVENTION

1. Field of the Invention

This invention relates generally to pulling cable and, more specifically, to pulling lightweight cable such as optical fiber cable.

2. Description of the Prior Art

The cable placement techniques for copper and aluminmum telephone power cables are a well developed art. Typically, the first step is pushing fish wire through a conduit to connect to a steel pulling cable. The pulling cable usually passes through a pulley system to produce a mechanical advantage. The pulling cable firmly connects to one end of a conductor cable which is to be pulled through the conduit. The conductor cable is fed into the conduit while an operator on the opposite end uses the pulley system to pull the cable through the conduit. With suitable lubricant and carefully constructed conduit, one can pull a 3½ inch diameter telephone cable up to 1,800 feet.

With the development of lightweight fiber optical cable, the use of the conventional pulling method is both cumbersome and expensive. Fiber optical cables are advantageous to use over copper conduit cables because fiber optical cables have a much smaller diameter and much lower density than copper conductors even though both transmit the same amount of information. A typical size for fiber optical cables is ¼ inch diameter and an overall density of less than 1 gram/milliliter. This size fiber optical cable will transmit as much information as 2 to 4 inch diameter copper cable with a density of 6 to 10 grams/milliliter.

To minimize the number of repeater stations and splices with fiber optical cable, it is preferred that fiber optical cable be installed in very long runs, usually in the range of 5 kilometers to 10 kilometers. Pulling cable up to 10 kilometers is a problem because it is well known that the pulling force to pull the cable through the conduit is equal to the sum of the frictional forces on both the pulling cable and the cable to be installed. The total frictional forces are generally a linear function of the length of the conduit through which the cable is pulled. Generally, the total frictional force resisting the pulling of the cable through a conduit becomes excessive as the length of the conduit increases beyond 2 or 3 kilometers. Even in the straight smooth conduits with use of lubrication, attempts to pull lengths beyond 2 or 3 kilometers have been unsuccessful.

A second problem resulting from the use of smaller diameter fiber optical cable is that the cables oftentimes become wedged between larger cables in the conduit. Cable manufacturers have attempted to strengthen the optical cables by making optical cable of high tensile strength to withstand the tension forces produced in long pulls. To make a high tensile strength cable requires incorporation of special strengthening fibers into the body of the cable. These fibers increase the strength but also increase the size and cost of the cable. Typically, the tensile strength can be increased to about 400 lbs. for a ¼ inch diameter cable.

The present system and apparatus solves the prior art problem of pulling lightweight cable by impelling a small diameter plug along a tube to pull the fiber optical cable therein by use of fluid pressure.

BRIEF SUMMARY OF THE INVENTION

A thin lightweight cable can be installed in a conduit by first placing end-to-end sections of fluid tight tubing of uniform diameter. Next the ends of the tubing are joined together to make a continuous length of uniform diameter tubing. A cable pulling plug which firmly holds the end of the cable is inserted in one end of the tubing. Next a special fitting is applied on the end of the tubing. Next a low friction fluid is pumped behind the plug forcing the plug down the tubing while also pulling the lightweight cable into the tubing. After the lightweight cable has been pulled to the opposite end of the tubing, the fluid is forced out of the tubing by forcing a wiper plug through the tubing under the pressure of a gas such as dry nitrogen.

DESCRIPTION OF THE PREFERRED EMBODIMENT

Figure 1:
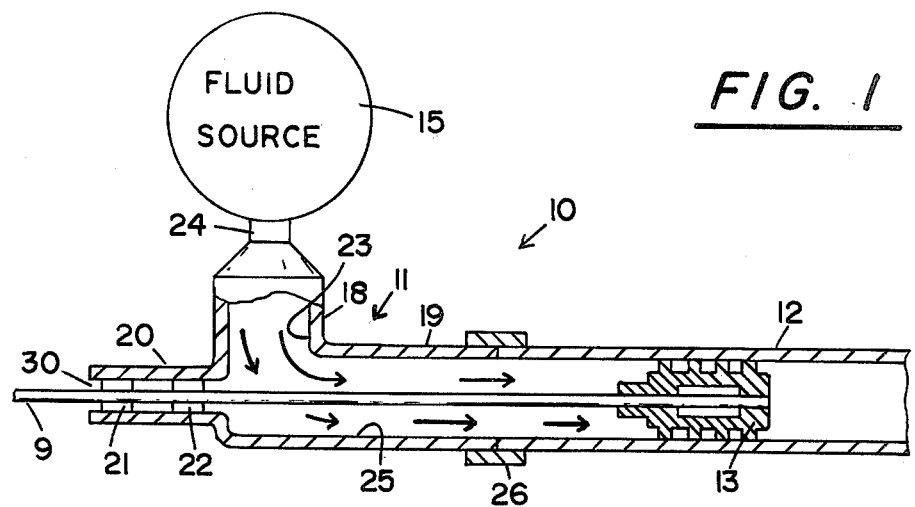
FIG. 1 is a sectional view of my lightweight cable pulling apparatus having a pulling plug therein.
Figure 2:
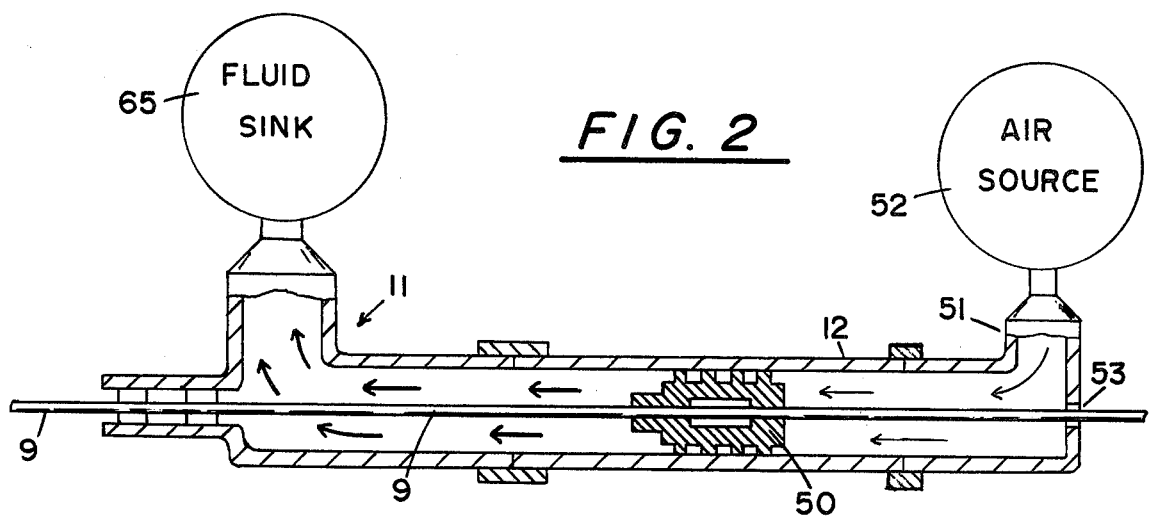
FIG. 2 is a sectional view of my lightweight cable pulling apparatus with a wiper plug therein.

Referring to FIG. 1, reference numeral 10 designates a tubing attachment 11 and a tubing 12 which extends between two remote locations. Tubing 12 may be a single tubing or may be a series of tubing which are joined end-to-end to produce a single continuous length of tubing. For example, tubing could be installed under city streets by running the tubing from manhole to manhole, usually a distance of a block. The ends of the tubing could then be sealed together to produce a single tubing which may be 5 kilometers or longer. Tubing 12 is typically a polymer plastic such as a polyethylene or the like. Attachment 11 contains section 19 which connects to tubing 12 by a sealing ring 26. Inlet passage 18 connects to a source of fluid 15 through a fluid passage 23 and a fluid passage 24. Attachment 11 contains a member 20 having a fluid tight cable entrance 30 for a lightweight and delicate cable such as fiber optical cable. Seals 21 and 22 form a leakproof seal around cable 9 to prevent fluid in attachment 11 from escaping past seals 21 and 22. Seals 21 and 22 also allow cable 9 to slide freely therethrough. Typically, seals 21 and 22 are made from a pliable material such as rubber or the like. In an alternate embodiment the seals and entrance passage can be omitted by placing the cable into a container filled with lubricant that attaches directly to the tubing.

Figure 3:
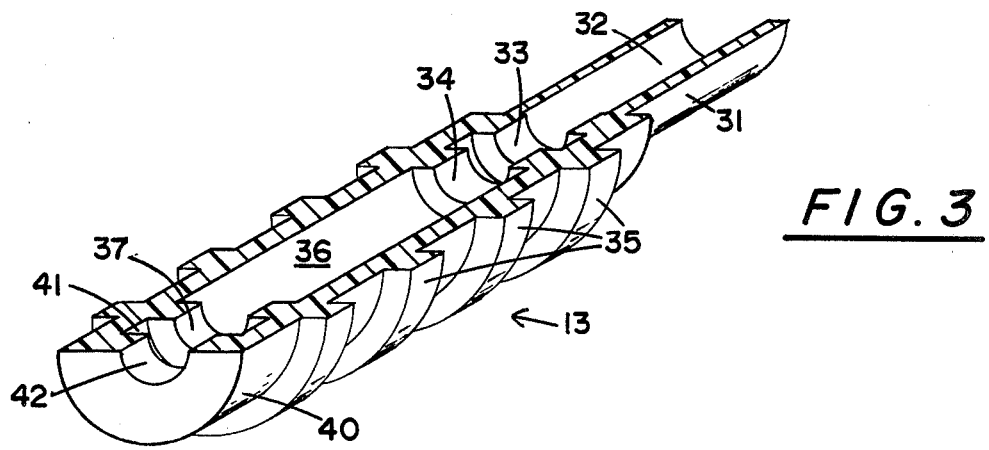
FIG. 3 is a sectional view of my pulling plug.

FIG. 1 shows a pulling plug 13 located in tubing 12. Pulling plug 13 is shown in cross section and in greater detail in FIG. 3. Pulling plug 13 comprises a sleeve 31 and a set of cylindrical surfaces 35 which slidably and sealingly engage the inside of tubing 12. Plug 13 has a central opening 32 and a set of frictional surfaces 33, 34, 37 and 42 which frictionally engage the lightweight cable therebetween. If desired, the end of lightweight cable 9 can be glued or mechanically fastened to pulling plug 13. The interior of plug 13 contains a chamber 36 with an opening having a larger diameter than the cable. The chamber 36 allows plug 13 to flex and compress to allow pulling plug 13 to pass through portions of the tubing which may be oblate or which may contain a curve.

Referring to FIG. 1, the system is shown in operation with pulling plug 13 firmly connected to optical cable 9. The arrows indicate liquid under pressure which flows from fluid source through passage 23 and forces plug 13 to slide along the interior of tubing 12. The fluid pumped from fluid source is water, alcohol or the like. However, in long runs it is preferable to use a low friction fluid such as an alcohol water solution of polyethylene oxide which is sold under the commercial name Polywater and is the subject matter of the Moorhouse U.S. Pat. No. 3,925,216. The fluid performs two functions: first, it forces plug 13 through tubing 12 and second, it provides a lubricant for the cable to be pulled through.

After the plug 13 has been forced to the opposite end of the tubing 12, the optical cable is set into a second attachment located on the opposite end and designated by reference numeral 51. Attachment 51 has an opening 53 for sealing and engaging the optical cable 9 and a fluid passage for connecting to a gas or air source 52. A preferred gas is dry nitrogen. A wiper plug 50 which is similar to pulling plug 50 is placed around optical cable 9 and inside of tubing 12. Air under pressure from source 56 forces wiper plug 50 along the inside of tubing 12. Wiper plug 50 contains a larger central opening to allow the wiping plug 50 to freely slide along optical cable.

The wiper plug has a squuege action as it is forced by air under pressure through tubing 12. Thus, the liquid is forceably removed from tubing 12 by forcing wiper plug 50 therethrough.

In an alternate embodiment a partial vacuum in fluid sink 65 would provide a suction force to remove the liquid.

If the runs ar short, it may be preferred to omit the use of liquid and propel the pulling plug and cable through the tubing with dry air or nitrogen. However, for most runs of 100 meters or more it is preferable to use an incompressible liquid.

I claim:

1. A method for pulling a lightweight cable from a first location to a second location comprising:

placing a tubing between the first location and the second location;

placing a pulling plug in the tubing, the pulling plug having a cable attached thereto which is to be pulled through the tubing;

forcing liquid under pressure into the tubing to force the pulling plug and the cable through the tubing; and placing a wiper plug in the tubing and forcing the wiper plug under gas pressure to remove the liquid in the tubing.

2. The invention of claim 1 wherein a low frictional liquid is pumped through the tubing to lubricate the cable and to force the pulling plug through the tubing.

3. The invention of claim 2 wherein an alcohol water solution of polyethylene oxide is forced through the tubing.

4. The invention of claim 3 wherein nitrogen gas under pressure forces the wiper plug through the tubing.

5. An apparatus for pulling a lightweight fiber optical cable through conduit comprising:

a tubing extending from the first location to a second location, said tubing having an inside surface for receiving a pulling plug;

an attachment connected to said tubing, said attachment having a fluid passage operable for connection to a fluid source;

a pulling plug, said pulling plug having an outer surface for sealably sliding along the inside surface of said tubing, said pulling plug having means therein for securing a lightweight cable thereto so that when fluid under pressure is introduced into said tubing the fluid pressure forces the pulling plug through the tubing thereby pulling the lightweight cable therewith; said pulling plug having a chamber therein to allow flexing of said pulling plug in response to curvature in said tubing; a wiper plug for forcing the fluid from the tubing without removing the cable therein.

6. The invention of claim 5 wherein said appparatus includes a source of alcohol water solution of polyethylene oxide.

7. The invention of claim 6 wherein said apparatus includes a gas source for forcing the wiper plug through the tubing.

8. The invention of claim 7 wherein said wiper plug has a central opening for sliding along the cable in the tubing.

* * * * *